US008613355B2

(12) United States Patent
Andreoli

(10) Patent No.: US 8,613,355 B2
(45) Date of Patent: Dec. 24, 2013

(54) SYSTEM FOR POSITIONING GUIDES OF A CONVEYOR

(75) Inventor: Andrea Andreoli, Modena (IT)

(73) Assignee: Rexnord Marbett S.R.L., Correggio (Reggio Emilia) (IT)

( * ) Notice: Subject to any disclaimer, the term of this patent is extended or adjusted under 35 U.S.C. 154(b) by 6 days.

(21) Appl. No.: 13/319,538

(22) PCT Filed: May 12, 2010

(86) PCT No.: PCT/EP2010/056568
§ 371 (c)(1),
(2), (4) Date: Dec. 30, 2011

(87) PCT Pub. No.: WO2010/130793
PCT Pub. Date: Nov. 18, 2010

(65) Prior Publication Data
US 2012/0090964 A1 Apr. 19, 2012

(30) Foreign Application Priority Data
May 12, 2009 (IT) .............................. MI2009A0808

(51) Int. Cl.
*B65G 21/20* (2006.01)
*B65G 15/00* (2006.01)
(52) U.S. Cl.
USPC ...................... 198/836.1; 198/837; 198/836.3
(58) Field of Classification Search
USPC ...................................................... 198/836.3
See application file for complete search history.

(56) References Cited
U.S. PATENT DOCUMENTS

| 5,322,160 A * | 6/1994 | Markiewicz et al. ...... 198/836.3 |
| 2003/0094352 A1* | 5/2003 | Andreoli et al. ........... 198/836.1 |

FOREIGN PATENT DOCUMENTS

| WO | 2004074146 A | 9/2004 |
| WO | 2004099042 A | 11/2004 |

OTHER PUBLICATIONS

International Search Report under date of mailing of Jul. 12, 2010 in connection with PCT/EP2010-056568.

* cited by examiner

*Primary Examiner* — Gene Crawford
*Assistant Examiner* — Lester Rushin
(74) *Attorney, Agent, or Firm* — Quarles & Brady LLP

(57) ABSTRACT

A positioning unit, comprising: a support for a member to be positioned; an actuator for moving the support between a plurality of predetermined working positions; a position selector comprising a plurality of spacers that can be moved into an operative position positioning a stem of the actuator corresponding to a said predetermined working position of the support, wherein the position selector is coupled to the actuator such that movement of the actuator during actuation drives the operation of the position selector. The positioning unit has particular application to the positioning of guides of a conveyor of articles.

10 Claims, 7 Drawing Sheets

SYSTEM FOR POSITIONING GUIDES OF A CONVEYOR

CROSS-REFERENCE TO RELATED APPLICATIONS

This application represents the national stage entry of PCT International Application No. PCT/EP2010/056568 filed May 12, 2010 which claims the benefit of Italian Patent Application MI2009A000808 filed May 12, 2009, both of which are hereby incorporated herein by reference for all purposes.

STATEMENT REGARDING FEDERALLY SPONSORED RESEARCH OR DEVELOPMENT

Not applicable.

FIELD OF THE INVENTION

The present invention relates to a positioning unit. The present invention has particular, but not exclusive, application to the field of conveyors of articles, for instance, belt conveyors, chain conveyors and pneumatic (air) conveyors, where it may be used for the positioning of transport/containment guides of the articles transported by a conveyor.

BACKGROUND OF THE INVENTION

Guides are generally provided in conveyors of articles for guaranteeing the correct routing of the transported articles in their movement along the transport path. Such guides can be of various types, depending on the type of conveyor they are associated with, and on the type of articles to be transported.

A same conveyor can be, and normally is, employed for transporting articles of different nature, different shape, or also simply articles of similar nature and/or shape, but of different dimensions.

To ensure the correct routing of the different types of articles that a conveyor is intended to transport, it is necessary to be able to adjust the position of the guides.

Let for example the case be considered of an air conveyor, for transporting of bottles in plastics (PET) from a station of production of the bottles to a following station of filling of the same with the desired liquids, drinks or others.

Such a conveyor essentially includes a chamber destined to be run through by a flow of air at high speed. The chamber extends along a bottles transport path, for sections of typical length variable from some tens up to some hundreds of meters.

The chamber is open at the bottom and it is adapted to accommodate the terminal portion of the neck of the bottles. The flow of air at high speed that runs through the chamber, hitting the terminal portion of the neck of the bottles, pushes the same in the desired transport direction, thereby determining the bottles movement along the transport path.

In their movement along the transport path, the bottles are supported by a pair of support guides. The support guides are placed in correspondence of the lower opening of the chamber and they extend parallelly and one in front of the other along the transport path. Such support guides act as supports for a support collar projecting from the terminal portion of the neck of every bottle. The bottles are therefore transported by the flow of air while being hung to the support guides through the respective support collars.

It is important that the bottles, in their movement along the transport path, are maintained substantially in vertical position. This allows in fact to avoid that, due to swinging of the bottles, especially in correspondence of curved sections of the transport path, the support collar stitches on the support guides causing undesired stops of some bottle and, as a consequence, of the whole train of bottles that follows it.

With the purpose of guaranteeing that the bottles are maintained substantially in vertical position, a pair of facing side containment guides is foreseen. The side containment guides extend parallelly and facing to one another along the transport path, at a lower height compared to the two support guides. Particularly, the two side containment guides are placed in proximity of the bottom of the bottles.

The two side containment guides are generally constituted by bars of metallic or synthetic material, supported by clamps arranged in longitudinal succession along the containment guides, for instance at regular intervals of about 50 cm. The clamps are provided of tangs that enable the fixing thereof to respective supports, which are mounted to brackets or bars that are fixed to the chamber and extended downward.

To perform their function, the two side containment guides need to be positioned in such a way as to be in contact or at least to graze the bottles body when the bottles move along the transport path.

Normally, an air conveyor has to allow the transport of bottles of different shapes and dimensions, particularly of different height and different diameter, for instance bottles of capacity of 0.5 lt, 1 lt, 1.5 lt and 2 lt.

From one side, the different height of the bottles to be transported makes it necessary to have side containment guides located at different heights; from the other side, the different diameter of the bottles to be transported makes it necessary for the position of the two transport guides transversally to the transport path to be adjustable.

Typically, two or three (or even more) pairs of side containment guides are foreseen, situated at different heights, approximately corresponding to the bottom portion of bottles of different height. Since bottles of greater height normally have also greater diameter, the position of the two pairs of guides located at higher heights needs to be adjustable, so that the guides of each of such pairs of guides can be moved from an operating position to a non-operating position in which the guides do not interfere with the movement of the bottles of greater height and diameter. For instance, the two containment guides placed at the highest height, that are used for containing bottles of small height and small diameter, for instance, bottles of 0.5 lt, shall be moved to the non-operating condition, and thus moved away from the center of the transport path, when the conveyor is employed for transporting bottles of increased height and diameter, for instance bottles of 1 lt, whose side containment is guaranteed by the pair of guides at immediately lower, intermediate height. Having to transport bottles of still increased height and diameter, for instance bottles of 1.5 lt or 2 lt, for the side containment of which the pair of guides located at the lowest height is exploited, both the pairs of guides at higher heights need to be moved away from the center of the transport path.

For adjusting the position of the containment guides it is known to employ pneumatic cylinder/piston groups that, when operated, move the tangs of the clamps relative to the vertical support bars. For example, in the case three pairs of containment guides are provided, in correspondence of every clamp there is provided a first pair of cylinder/piston groups for the two containment guides at higher height and a second pair of cylinder/piston groups for the two containment guides at intermediate height (the two containment guides at lower height can be fixed, since they, also when unused, do not interfere with the movement of the bottles of smaller height).

It is clear that as a similar solution requires a high number of cylinder/piston groups, something that is undesired because it causes an increase of the costs both in terms of components and assemblage, and of maintenance.

Multiple side containment guides are also known, comprising two pairs of guides located at different heights and with increasing central gap as the height decreases, fixed through respective clamps and vertical conjunction bars to a single tang. The two or more pairs of guides are in such case integrally movable, i.e. their position cannot be individually regulated, moving the tang relative to the vertical support bar through a single cylinder/piston group. The number of cylinder/piston groups to be used is reduced, but it is necessary to use cylinder/piston groups with three operating positions: two for bringing the pairs of guides at highest height and intermediate height to the respective operating positions, and one for bringing both the pairs of guides to the non-operating position.

Cylinder/pistons groups with three operating positions are however expensive, and therefore the solution is not particularly pleasant.

In WO 2004/074146, an actuator assembly for a guide of adjustable width of a conveyor of bottles is described, in which the selection of an operating position by means of control rod 34 is an operation that is independent from the actuation of the housing 12/piston rod 14 assembly.

SUMMARY OF THE INVENTION

According to a first aspect, the present invention may provide a positioning unit, comprising: a support for a member to be positioned; an actuator for moving the support between a plurality of predetermined working positions; a position selector comprising a plurality of spacers that can be moved in an endless sequence into an operative position which determines an end-run position of the actuator corresponding to a said predetermined working position of the support, wherein the position selector is coupled to the actuator such that movement of the actuator during actuation drives the operation of the position selector.

A positioning unit according to the present invention exploits the movement of the actuator during actuation to drive the operation of the position selector.

Preferably, said operation comprises a selection cycle during which a transition is made replacing a current spacer with a next spacer in the operative position.

In a preferred embodiment, the selection cycle comprises a first phase in which an excursion of the actuator in a first direction takes places. The excursion of the actuator in the first direction may drive the initiation of said transition. The excursion of the actuator in the first direction may also drive a spring mechanism into a compressed condition. The selection cycle may further comprise a second phase in which the spring mechanism is released from its compressed condition, and drives the completion of said transition. After completion of the selection cycle, the actuator may be operable to make an excursion in a second direction opposite said first direction limited in travel by the spacer in the operative position, thereby moving the support into a said predetermined working position.

In one embodiment, the position selector comprises a rotation mechanism for moving the spacers into said operative position. In other embodiments, other mechanisms may used, for example, an endless chain bearing the spacers may be used to deliver the spacers into said operative position.

The actuator may comprise a pneumatic or hydraulic cylinder/piston assembly or an electric linear actuator.

According to a second aspect, the present invention may provide a system for adjusting the position of guides of a conveyor of articles comprising a positioning unit according to the first aspect of the present invention in which the member to be positioned comprises at least one guide of the conveyor.

According to a third aspect, the present invention may provide a conveyor of articles having guides for the support and/or containment and/or routing of the article that are positioned by a positioning unit according to the first aspect of the present invention.

According to a further aspect, the present invention may provide a system for adjusting the position of guides of a conveyor of articles is provided, comprising:
  means for moving a support of at least one guide of the conveyor, said means being operable to bring the at least a guide to a working position; and
  means for the selection of the working position of the at least one guide, said selection means being adapted to define at least two pre-selected working positions of the at least one guide, said selection means comprising at least two mechanical spacers for the movement of said support, each of said at least two mechanical spacers being selectable by the selection means to determine a respective end-run of the movement of the support corresponding to a respective one of the at least two working positions of the at least one guide.

The driving of said selection means is automatic and exploits the energy used for operating said moving means.

Said selection means may include a rotating selector, and each one of said at least two mechanical spacers is re-selectable cyclically.

Said moving means may include one among a pneumatic or hydraulic cylinder/piston assembly or an electric linear actuator, that drives a first stem, and a mechanical coupling element of the first stem to said support of the guide.

Said rotating selector may be driven by the moving means of the support.

Said rotating selector may include a second stem joined to said mechanical coupling element so as to be movable following the movement of said first stem, said second stem operating, when moved, a step-by-step rotation mechanism apt to determine the step-by-step rotation of an element that carries the mechanical-spacers.

Said step-by-step rotation mechanism may be adapted to effect the rotation of an angle corresponding to the angular distance between at least two mechanical spacers in consequence of at least a fro or back movement or of a fro and at least partial back movement cycle of the first stem.

The step-by-step rotation mechanism may include a toothed rotor integral to said element that carries the mechanical spacers and movable through said second stem, and a stator comprising elements of engagement with the teeth of the toothed rotor to determine the step-by-step rotation of the rotor when the latter slides with respect to the stator in consequence of the movement of the second stem.

Said rotating selector may be actuated by a pneumatic or hydraulic actuator that is operated exploiting the same pneumatic or hydraulic energy used for operating said pneumatic or hydraulic cylinder/piston assembly.

Said rotating selector may be actuated by an electric actuator that is operated exploiting the same electric energy used for operating said electric linear actuator.

According to a still further aspect, the present invention may provide a conveyor of articles comprising guides for the support and/or the containment and/or the routing of the transported articles and comprising a system of adjustment of the position of the guides according to any the previous aspect of the invention.

BRIEF DESCRIPTION OF THE DRAWINGS

Exemplary embodiments of the present invention are hereinafter described with reference to the accompanying drawings, in which.

DETAILED DESCRIPTION OF THE EXAMPLE EMBODIMENTS

Figure 1:
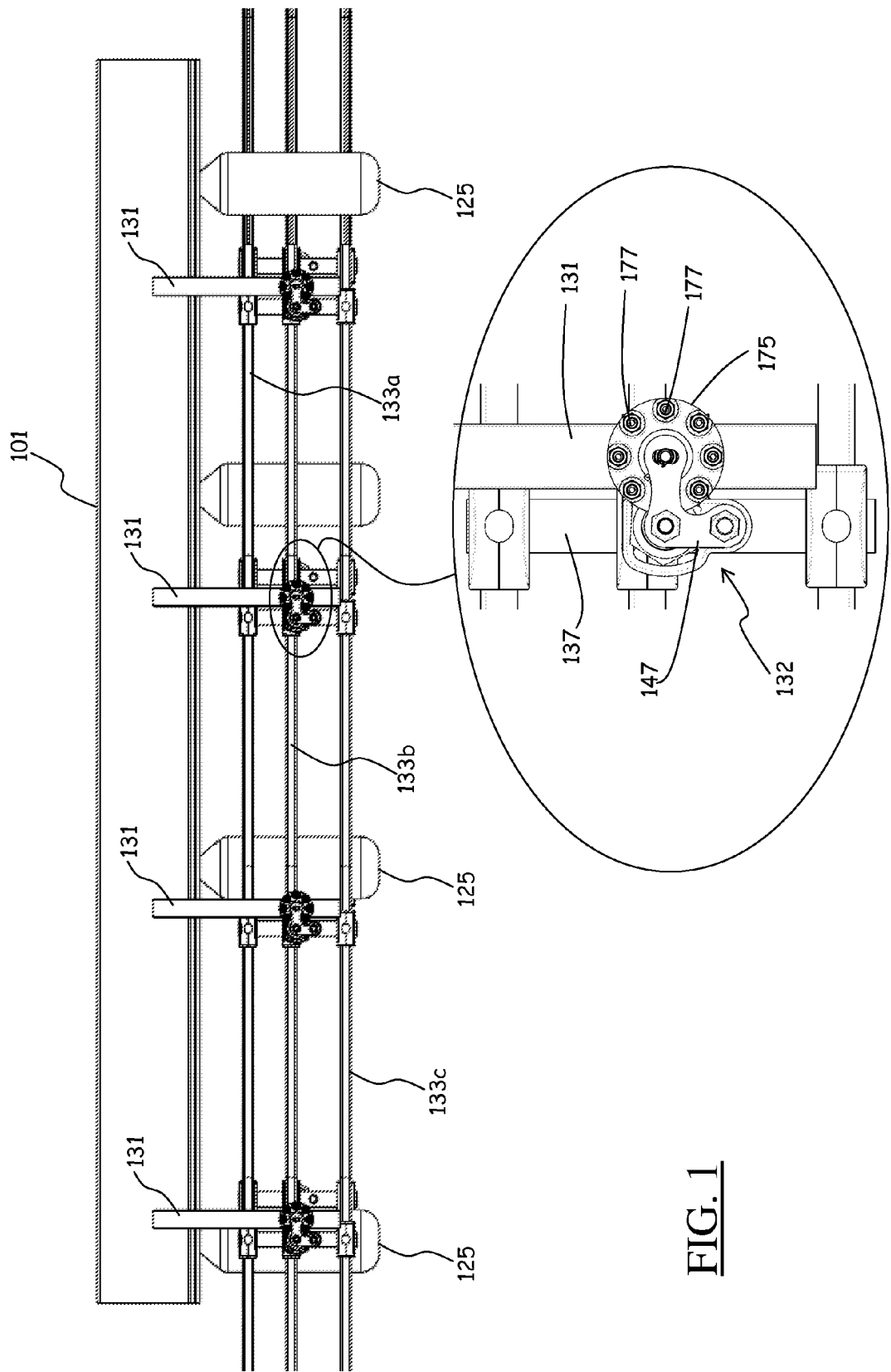
FIG. 1 is a side view of a line of a conveyor of articles, particularly an air conveyor, comprising a system for adjusting the position of guides according to an embodiment of the present invention, with a detail of the adjustment system shown in enlarged scale.
Figure 2:
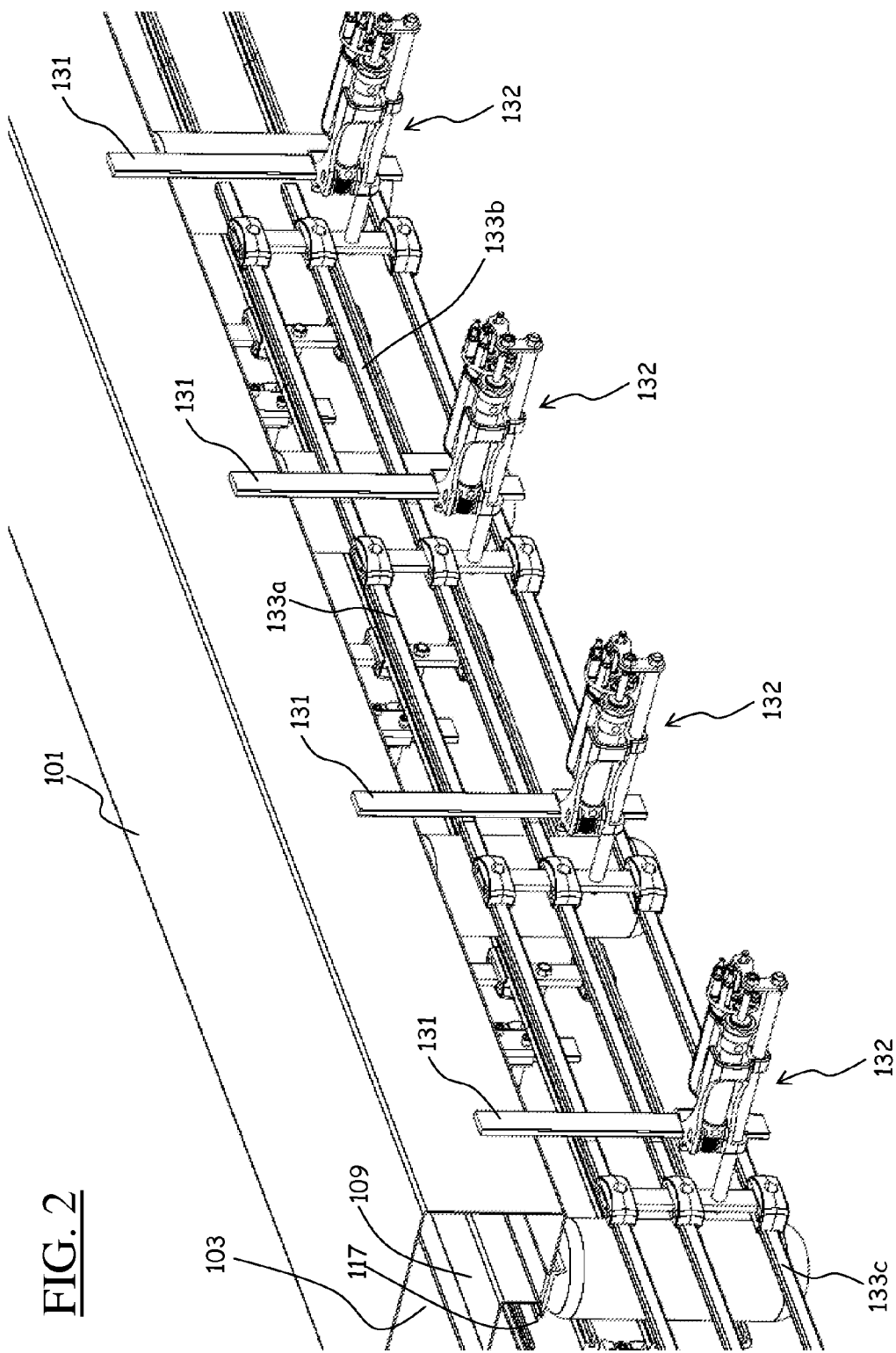
FIG. 2 is an axonometric view of the conveyor line of FIG. 1.
Figure 3:
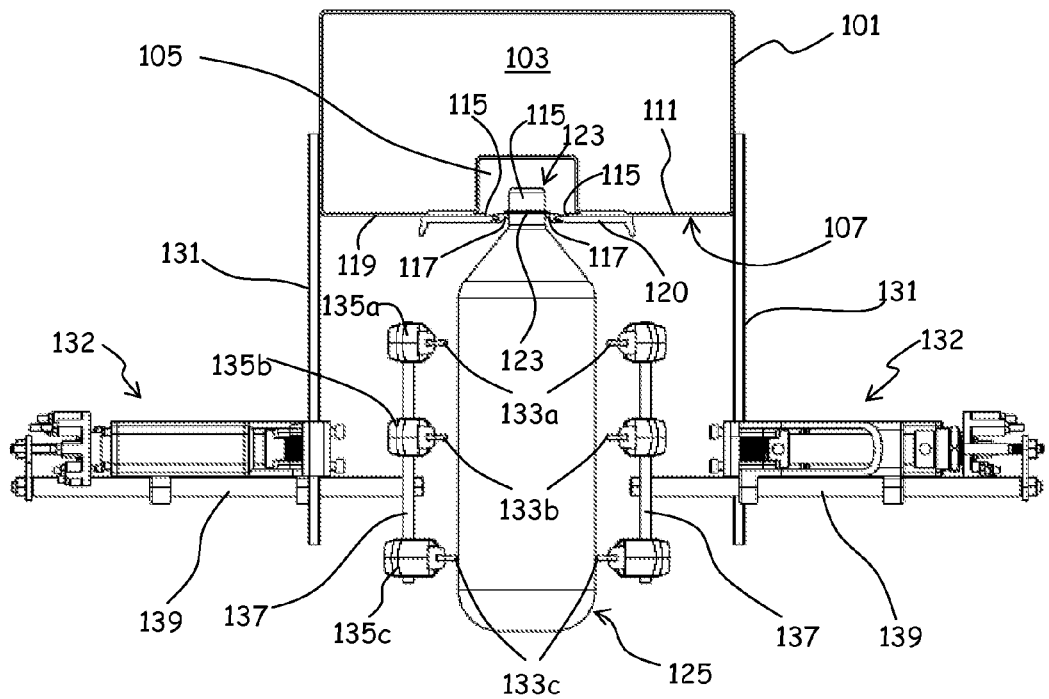
FIG. 3 is a front view of the conveyor line of FIGS. 1 and 2.
Figure 4:
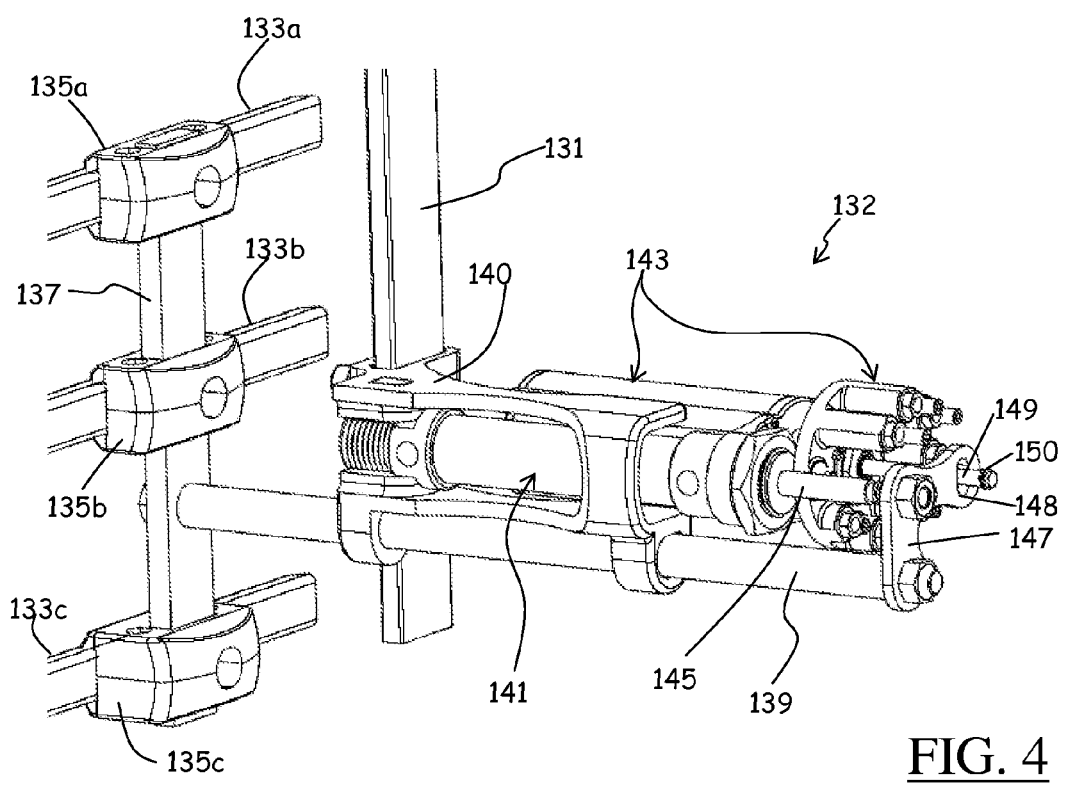
FIG. 4 show in enlarged scale and in axonometry a detail of a unit of regulation of the position of the guides of the conveyor of FIG. 2, according to an embodiment of the present invention.

With reference to the drawings, in FIGS. 1, 2 and 3 there is shown, respectively in side view, in axonometry and in front view, a line of a conveyor of articles, particularly an air conveyor, even more particularly an air conveyor for the transport of bottles in plastics. The conveyor can for instance belong to a manufacturing line comprising a bottles manufacturing station, typically a station of plastic moulding by blowing, and a station of filling of the bottles with the predetermined liquid, drinks or other. The conveyor has therefore the function of transporting the bottles exiting the bottles manufacturing station to the filling station.

The conveyor includes a box-shaped enclosure 101, in the example shown having generically rectangular cross section, that extends along a bottles transport path. The box-shaped enclosure 101 defines thereinside a duct 103. The duct 103 is intended to be run through by a flow of air at high pressure, for instance generated by one or more electro-fans, not shown in the drawings, located at an end of the duct 103 of the transport path.

Inside the box-shaped enclosure 101a chamber 105 is formed, of smaller substantially dimensions. The chamber 105 extends, in correspondence of the bottom wall 107 of the box-shaped enclosure 101, for the whole transport path. The chamber 105 is laterally and upperly delimited by a profiled member 109 fixed to the inner side 111 of the bottom wall 107.

Collectors (not shown in the drawings) are formed along the profiled member 109, that allow the flow of air that runs through the duct 103 to penetrate into the chamber 105. The chamber 105 result in such a way run through by a flow of air at high speed.

In the bottom wall 107 of the enclosure 101, substantially in central position, an opening 115 is formed that extends along the whole transport path. The profiled member 109 is fixed to the bottom wall 107 of the enclosure 101 in correspondence of such opening 115, so that the chamber 105 results open at the bottom. At each of the two sides of the opening 115 there is associated a respective support guide 117, that extends along the whole transport path. The two support guides 117 are mounted to an external side 119 of the bottom wall 107 through respective shelves 121.

The two support guides 117 define therebetween a gap of dimensions adapted to the passage without interference of necks 123 of transported bottles 125, at the same time providing a support for a support collar 127 projecting from the neck 123 of each bottle 125. The support collar 127 is conventionally formed in intermediate position along the neck 123 of the bottle 125, so that a terminal portion 129 of the neck extends inside the chamber 105 and, in operation, is hit by the flow of air at high speed that runs through the chamber 105.

The bottles 125 are in such way transported along the transport path while being hung to the support guides 117 through the respective support collars 127, by the flow of air at high speed that runs through the chamber 105 and that hits the respective terminal portions 129 of the necks 123.

A plurality of bar pairs 131 is arranged in preferably periodic succession along the transport path. The bars 131 are fixed, at their upper free ends, to the box-shaped enclosure 101, at the two sides thereof, and they extend downward. Pairs of bars 131 fixed to the opposite sides of the enclosure 101 face one another. Each bar 131 provides a support for a respective unit 132 for the positioning of side containment guides of the bottles, as described in detail hereinafter.

The side containment guides are for instance constituted by pairs of bars, in metal or in synthetic material or other suitable material, that extend parallelly to each other along the transport path below the support guides 117, for instance at a height corresponding to that at which the substantially cylindrical portion of maximum diameter of the bottles 125 to be transported is located, particularly in proximity of the bottom of the bottles. In the example here considered, three pairs of side containment guides are foreseen, located at different heights, for the side containment of bottles having different height. Particularly, a first pair of containment guides 133*a*, located at a higher height, is provided for the side containment of bottles of relatively small height, for instance bottles of 0.5 lt. A second pair of containment guides 133*b*, located at intermediate height, is provided for the side containment of bottles of greater height, for instance bottles of 1 lt. A third pair of containment guides 133*c*, located at the lowest height, is provided for the side containment of the tallest bottles, for instance bottles of 1.5 lt or 2 lt.

The side containment guides mainly have the function of keeping the bottles 125 substantially vertical in their movement along the transport path, preventing swinging, especially in correspondence of curved sections of the transport path, that could cause stops in the flow of the transported bottles.

In the example here considered, the three pairs of side containment guides 133*a, b, c* are fixed, through suitable clamps 135*a*, 135*b*, 135*c*, to two vertical conjunction bars 137, located at the two sides of the transport path and facing each other. Each one the two conjunction bars 137 are mounted to a shaft 139 of a respective unit 132 for the adjustment of the position of the guides, or guides positioning unit.

The clamps 135*a*, *b*, *c* are such that the three guides 133*a*, *b*, *c* are at different distances from the conjunction bar 137: the guide 133*a* is at the smaller distance, the guide 133*c* is at the greater distance and the guide 133*b* is at an intermediate distance. In such a way, the gap between the guides 133*a* at the highest height is wider than the gap between the guides 133*b* at the intermediate height, and the gap between the guides 133*b* is in turn wider than the gap between the guides 133*c* at the lowest height. Thanks to this, when the guides 133*b* are positioned for the side containment of the bottles of greater height, that also have greater diameter, the pairs of guides 133*a* and 133*b* do not interfere with the movement of the bottles; likewise, when the guides 133*c* are positioned for the side containment of the bottles of intermediate height, the pair of guides 133*a* does not interfere with the movement of the bottles (the pair of guides 133*c* at the lowest height does not interfere since the height of the bottles is such that the bottom thereof is at higher height compared to the guides 133*c*). When the guides 133*a* are positioned for the side containment of the bottles of smallest height, the pairs of guides 133*b* and 133*c* do not interfere with the movement of the bottles, since the height of the bottles is such that the bottom thereof is at higher height relative to the guides 133*b*.

As mentioned in the foregoing, positioning units 132 are provided for the positioning of the side containment guides, the positioning units 132 being mounted to the vertical bars 131 through respective supports 140. In the exemplary embodiment here considered, the generic unit 132 of positioning of the containment guides includes a pneumatic cylinder/piston 141 group associated with, and driving a selector 143 of the guides operating position, of which the shank 139 to which the vertical conjunction bar is fixed is a part. In the drawings, for not complicating them, the compressed air supply network supplying the pneumatic cylinder/piston groups 141 is not shown. In the exemplary embodiment here considered and described, each cylinder/piston group 141 has two compressed air inlets/outlets or supply/discharge passageways: one passageway in correspondence of a first chamber of the cylinder placed at the head of the piston (for head there is intended the side of the piston opposite to the side connected to a stem 145), and the other passageway in correspondence of a second chamber of the cylinder placed at the tail end of the piston (the tail being the side of the piston connected to the stem 145). By pressurizing the first chamber, feeding compressed air through the supply passageway at the head of the piston (and keeping the other supply passageway, located at the piston tail, discharged at the atmospheric pressure) the movement of the piston in a direction is determined, while vice versa by pressurizing the second chamber, supplying compressed air through the supply passageway located at piston tail (and keeping the other passageway, located at the piston head, discharged at the atmospheric pressure) the movement of the piston in the opposite direction is determined.

Figure 5:
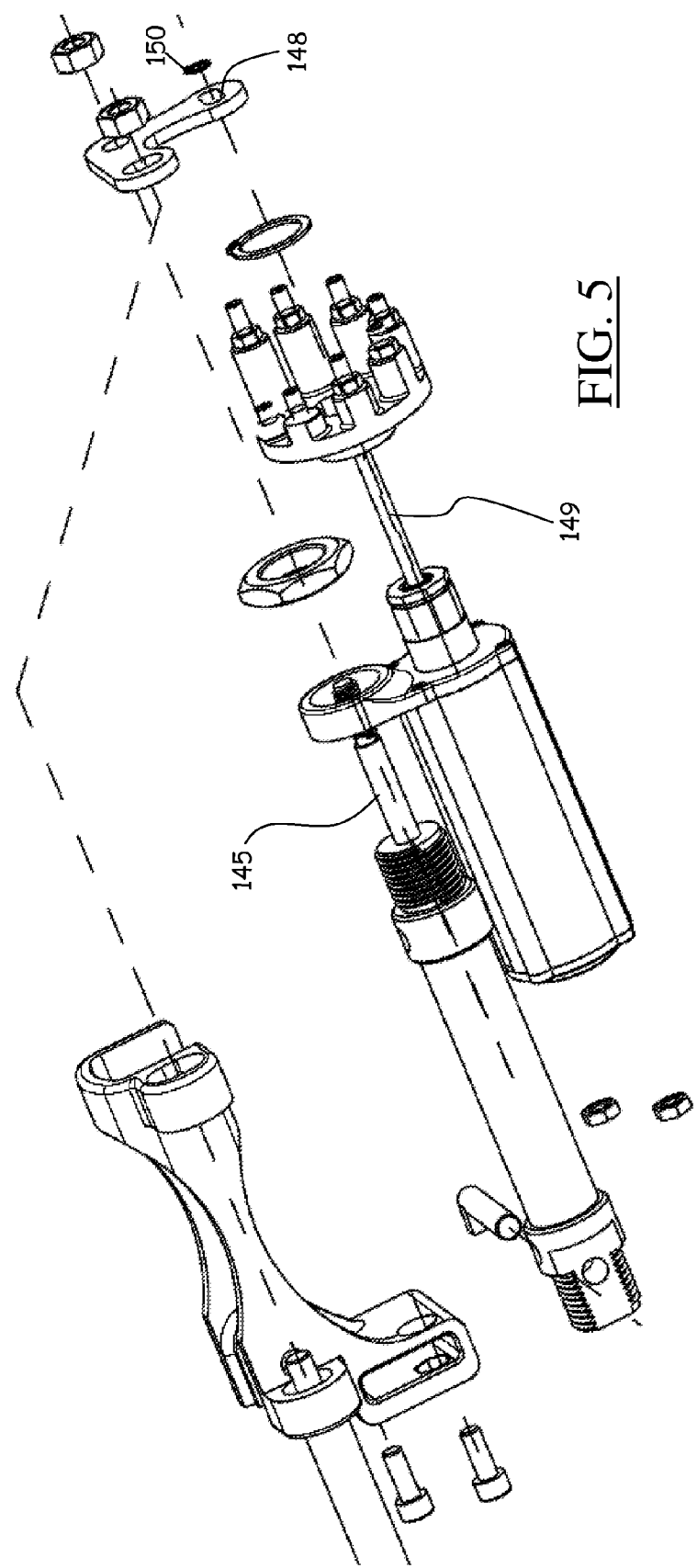
FIG. 5 is a partially exploded view of the unit of regulation of the position of guides of FIG. 4.
Figure 6:
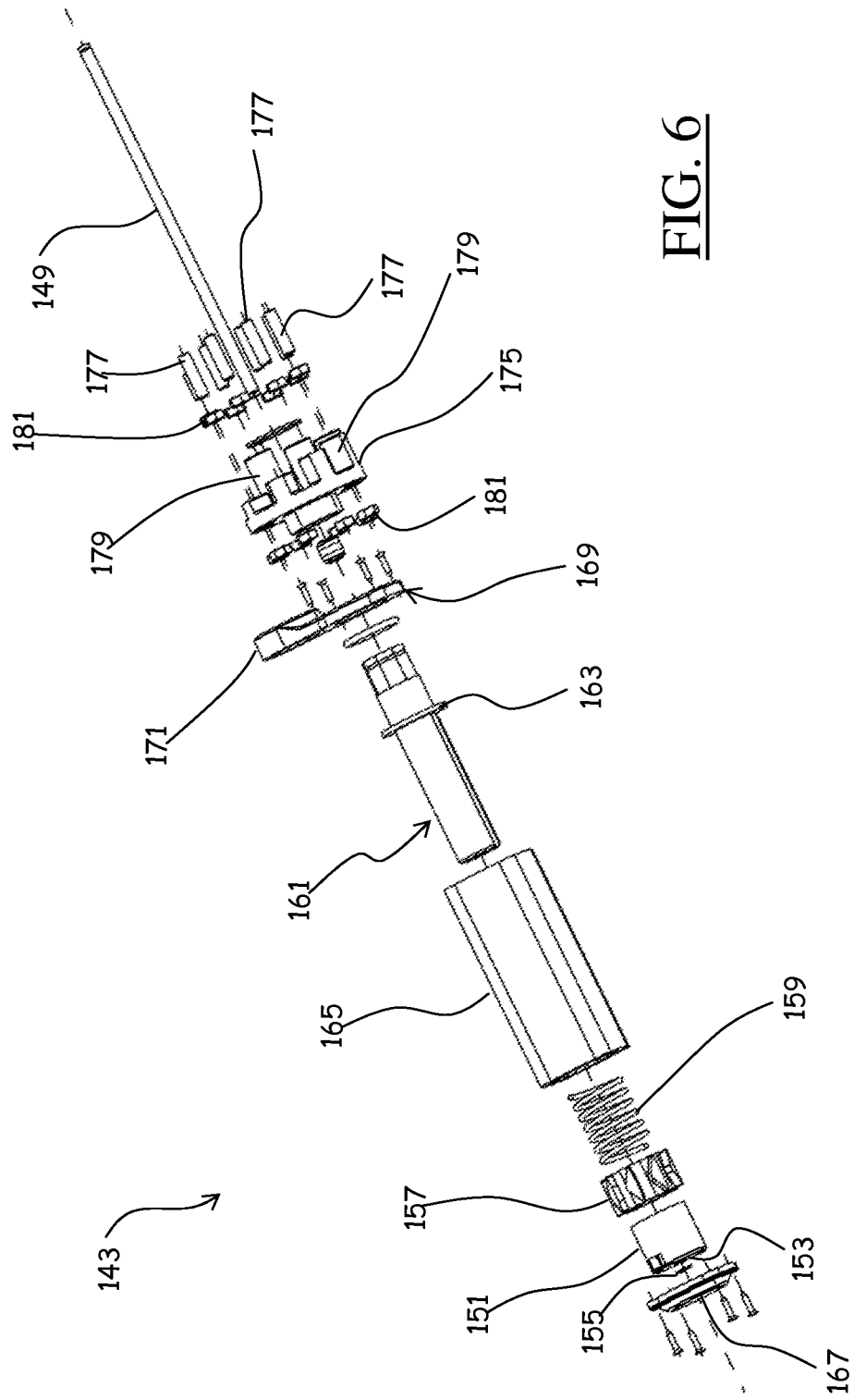
FIG. 6 is an exploded view of a selector of position of the unit of regulation of the position of the guides shown in FIG. 4.

In greater detail, making reference to the exploded views (FIGS. 5 and 6) of the generic unit 132 and of the selector 143, the cylinder/piston group 141 drives, through a respective stem 145 and an "L"-shaped bracket 147, the movement of a stem 149 of the selector 143.

The stem 149 of the selector 143 is joined to the "L"-shaped bracket 147 in a freely rotatable way and with play; particularly, the end of the stem 149 passes through a slot 148 of the "L"-shaped bracket 147 and a seeger ring 150 inserted on the end of the stem 149 prevents the latter from sliding out of the slot 148.

The position selector 143 is, in the example here considered, a rotary selector.

The stem 149 passes through substantially the whole body of the selector 143, and extends to protrude from the bottom 151 of a glass-shaped-shaped element 153; a second seeger ring 155 prevents the sliding out of the stem 149 from the glass-shaped element 153.

A toothed crown 157 is aligned to the glass-shaped element 153, the toothed crown having planar triangular teeth arranged along the whole circumference thereof: each tooth is a triangle with base parallel to the axis of the toothed crown 157, and the vertexes of the triangles forming the teeth are aligned along a circumference. The glass-shaped element 153, the toothed crown 157 and a spiral spring 159 are inserted on a pin 161; the spring 159 is interposed between the toothed crown 157 and a collar 163 projecting from the pin 161. The pin 161, the spring 159, the toothed crown 157 and the glass-shaped element 153 are accommodated within an internally grooved sleeve 165, as will be described in greater detail in the following. The toothed crown 157 is in particular inserted on the pin 161 so as to be slidable therealong without possibility of relative rotation; this is for instance achieved through a prismatic joint between the toothed crown 157 and the pin 161.

The sleeve 165 is closed, at an end, by a bottom 167, screwed to the sleeve 165 and apt to substantially guarantee a hermetic seal (to avoid the infiltration of liquids and dirt); at the opposite end, the sleeve 165 is closed by a cover 169, also screwed to the sleeve 165, and shaped so as to form a slot 171 through which an end of the cylinder 141 passes (whose axis is thus parallel to the axis of the rotary selector 143). An end portion 173 of the pin 161 protrudes from the sleeve 165 through an opening in the cover 169 (gasket means being foreseen for preventing the infiltration of liquids and dirt); the end portion 173 has hexagonal cross-section for the prismatic joining to a spacer-carrying wheel 175. The spacer-carrying wheel 175 carries a plurality of spacers 177, arranged in circumferential succession. In the example here considered, the spacers are in number of eight, arranged in circumferential succession at regular intervals of ⅛ of 360°. The spacers 177 are, in the considered example, threaded rods of different axial length and they are inserted into respective columns 179 of the spacer-carrying wheel 175, having different axial length; the threaded rods 177 pass through the columns 179 and are stopped to the two sides by dice 181.

With the purpose of creating suitable plays to avoid possible situations of blocking or jamming, for instance caused by the dirt or by geometric or assemblage imperfections, the bracket 147 is tightly packed onto the stem 145 that is free to rotate around its own axis; the stem 139 is joined to the bracket 147 so as to result freely revolving around its own axis.

The spacer-carrying wheel 175 can rotate, as will be described in the following. Making the wheel 175 to rotate, the different spacers 177 are brought from time to time in operational position, in sequential way, and, cyclically, the generic spacer 177 can be brought into the operating position by completing a whole turn of the spacer-carrying wheel 175. Thanks to the shape of the "L"-shaped bracket 147, the dimensions of the spacer-carrying wheel 175 and the arrangement of the spacers 177, only one spacer 177 at a time can be in the operating position, in which the central part of the horizontal portion of the bracket 147 abuts the end of the spacer (as visible in the enlarged detail in FIG. 1).

Figure 7:
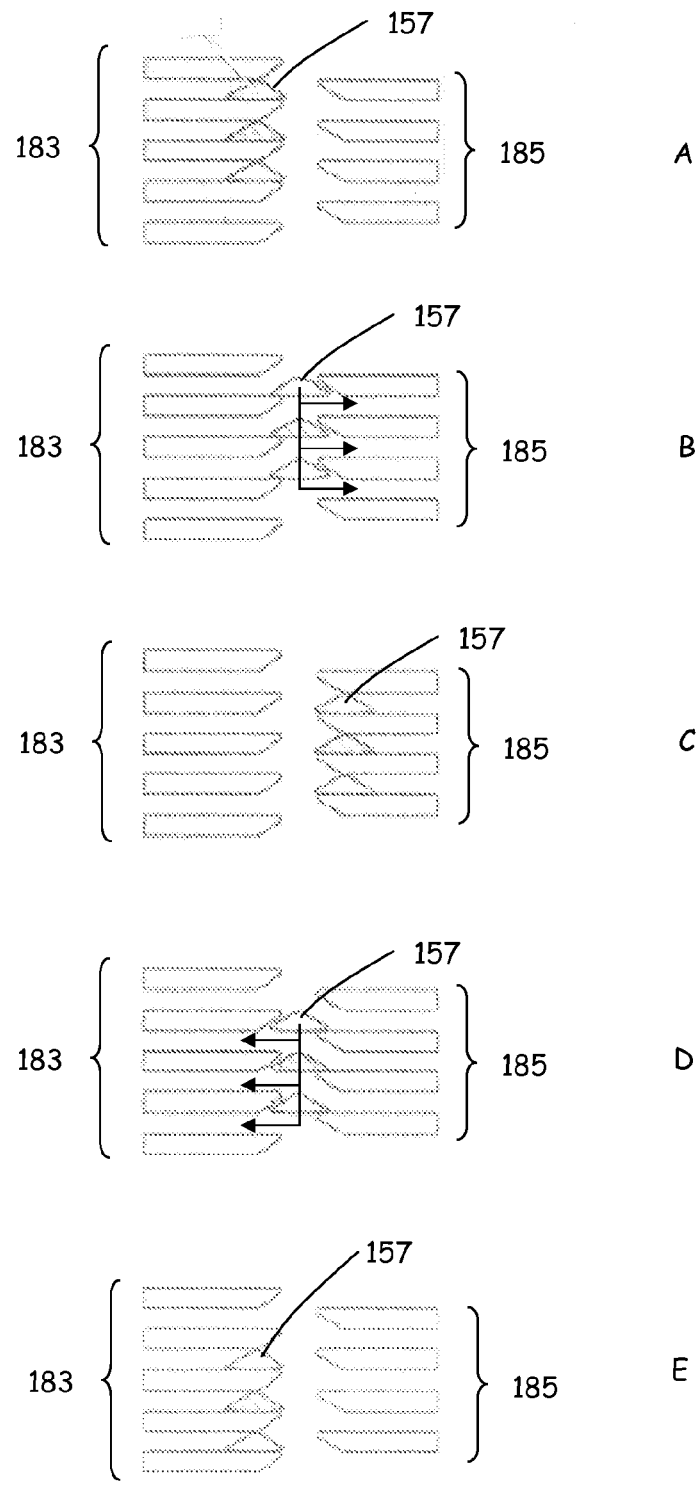
FIG. 7 schematizes, in some snapshots, the operation of a selector of position of the unit of regulation of the position according to an embodiment of the present invention.

As mentioned in the foregoing, inside the sleeve 165 a groove is formed, complementary to the teeth formed on the crown 157. As schematized in FIG. 7, the sleeve 165 forms the stator of a rotary mechanism whose rotor is represented by the toothed crown 157. The grooves formed in the sleeve 165 are divided in a forward portion 183, close to the bottom 167, and a back portion 185 with mirror symmetry and angularly out of phase relative to the previous one of ¹⁄₁₆ of 360° and proximate to the cover 169; both the forward and back portions extend circumferentially along the whole inner surface of the sleeve 165.

The operation of the position selector 143 of the side containment guides will be described hereinafter.

When the pneumatic cylinder/piston group 141 is actuated, by supplying compressed air through the supply passageway at the head of the piston (and keeping discharged the passageway at the piston tail) the stem 145 thereof extends, pushing the "L"-shaped bracket 147 backwards. The bracket 147 drags the stem 149 of the selector 143; the stem 149 of the selector 143 drags the glass-shaped element 151 that pushes the toothed crown 157 along the pin 161, determining the compression of the spring 159 between the toothed crown 157 and the collar 163. In the run of the toothed crown 157 along the pin 161, the teeth of the toothed crown 157 that already, in the starting condition, engage the forward portion of the grooves 183 of the sleeve (snapshots A, B and C of FIG. 7), first approach and subsequently penetrate into the back portion of the grooves 185, determining the rotation of ¹⁄₁₆ of 360° of the toothed crown 157; since the toothed crown 157 is rotationally integral to the pin 161, also the latter and the spacer-carrying wheel 175 rotate of ¹⁄₁₆ of 360°.

By evacuating air from the cylinder/piston group 141 (discharging the supply passageway at the piston head), the strength of the spring 159 causes the axial backward movement of the toothed crown 157 to the starting position; in the backward movement, the teeth of the toothed crown 157 that already engage the back teeth 185 formed inside the sleeve 165 (snapshots D and A in FIG. 6), first approach and subsequently penetrate the forward portion of the grooves 183, determining the rotation of a further ¹⁄₁₆ of 360° of the toothed crown 157, and accordingly of the pin 161 and of the spacer-carrying wheel 175. Altogether, in the forward and backward movement of the mobile assembly constituted by the glass-shaped element 153 and the toothed crown 157 from the initial position (snapshot A of FIG. 7) to the final position (snapshot E is of FIG. 7), the toothed crown 157, and accordingly the pin 161 and the spacer-carrying wheel 175 mounted on the pin 161, complete a rotation of ⅛ of 360°, bringing in the operating position the next spacer 177, of different axial extension compared to the one that, at the beginning, was located in the operating position.

The movement of the guide support stem 139 is completed toward the working position of the guides by feeding compressed air through the supply passageway at the piston tail (and thus pressurizing the chamber of the cylinder at the stem 145 side) of the cylinder/piston 141 group. The stem 145 therefore reenters into the cylinder 141 and the "L"-shaped bracket 147 is brought into abutment against the spacer 177 that has previously been brought into the operating position; in other words, the spacer 177 that is in the operating position acts as an end-run element for the return of the stem 139, as the "L"-shaped bracket 147 go into abutment against it.

Therefore, the working distance of the vertical conjunction bar 137 of the guides from the vertical support bar 131 mounted on the shank 139, which is in turn connected to the bracket 147, depends on the length of the spacer 177 that is in operating position. In this way, by making the spacer-carrying wheel 175 to rotate so as to bring the desired spacer 177 into the operating position (possibly repeating twice or more the operations described above), it is possible to correctly adjust the working position of the side containment guides.

In synthesis, in the exemplary embodiment shown and described, the action of rotation of a step (⅛ of turn) of the spacer-carrying wheel 175 is achieved (first phase) through a full excursion/complete extension of the stem 145 of the cylinder/piston 141 group, pressurizing only the chamber of the cylinder/piston 141 group at the head of the piston (first ¹⁄₁₆ of turn), and (second phase) through the following depressurization with discharge of the chamber at the piston head (second ¹⁄₁₆ of turn), also keeping discharged the pressure of the chamber of the cylinder/piston 141 group at the side of the stem 145 and relying on the expansion action of the spring 159, that had previously been compressed. This second part of rotation of ¹⁄₁₆ of turn of the spacer-carrying wheel 175 takes place when pressure is removed from the chamber of the cylinder/piston 141 group at the piston head, because the spring 159, no longer contracted, recovers its natural extension thereby producing the previously described series of movements inside the rotary selector 143. Once the rotation of ⅛ of turn of the wheel 175 has completed, by pressurizing the chamber of the cylinder/piston 141 situated at the piston tail (at the side of the stem 145), the return excursion/complete reentry of the stem 145 is initiated dragging the bar 139 connected thereto through the bracket 147 up to the attainment of the guides working position until finally reaching a stop point determined by the selected spacer 177.

Once the stop point is reached, in order to keep the bar 139 steady in working position the chamber of the cylinder/piston 141 situated at the piston (at the side of the stem 145) is kept pressurized, thereby avoiding that stresses exerted by the moving articles on the containment guides causes the withdrawal of the same.

The aforesaid operations are performed by each one of the position adjustment units 182, at both sides of the transport path, synchronously, just like the supply of compressed air to all the cylinders/pistons on the same plant are synchronous.

By providing, as in the example here considered, eight spacers 177 of different axial length, eight different possible positions are made available for the vertical conjunction bar 137 that supports the side containment guides; these eight possible positions of the bar 137, in combination with the provision of the three pairs of containment guides 133a, 133b, 133c at different heights and with different intermediate gap, allow to position the proper pair of facing guides depending on the type of bottle to transport.

As mentioned in the foregoing, in order to select one of the eight positions of the containment guides, predetermined by spacers 177 of the wheel 175, a repeated sequence of actuations of the generic cylinder/piston 141 group may be necessary, or a repetition of cycles of pressurization and discharge of the chamber of the cylinder/piston 141 group located at the piston head, until, by steps of ⅛ of turn for every cycle, the desired spacer 177 is brought into the angular working position. Only when the desired spacer 177 has reached the working position the chamber of the cylinder located at the piston tail (at the side of the stem 145) is pressurized, such chamber remaining up to that moment (i.e. during the intermediate cycles) not pressurized. However, nothing prevents that, also in the intermediate cycles, the chamber of the cylinder at the piston tail is pressurized, to promote the return of the spring 159 of the rotary selector 143.

Repeating eight cycles of pressurization and discharge of the chamber of the cylinder/piston 141 group located at the piston head, the initially selected spacer 177 returns in the working position.

It can thus be understood that the selection of the operating position of the guides, i.e. the selection of the desired spacer 177, is automatic and does not require manual interventions. Particularly, the same energy that is used for moving the shank 139 that in turn moves the containment guides, is also exploited for actuating the selector 143 of the guides operating position, and therefore to select the desired spacer 177: by supplying compressed air to the chamber at the head of the cylinder/piston 141 group, the extension of the stem 145 is determined, and thanks to the cinematic joining between the stem 145 and the stem 149 of the selector 143, this last is actuated.

Figure 8:
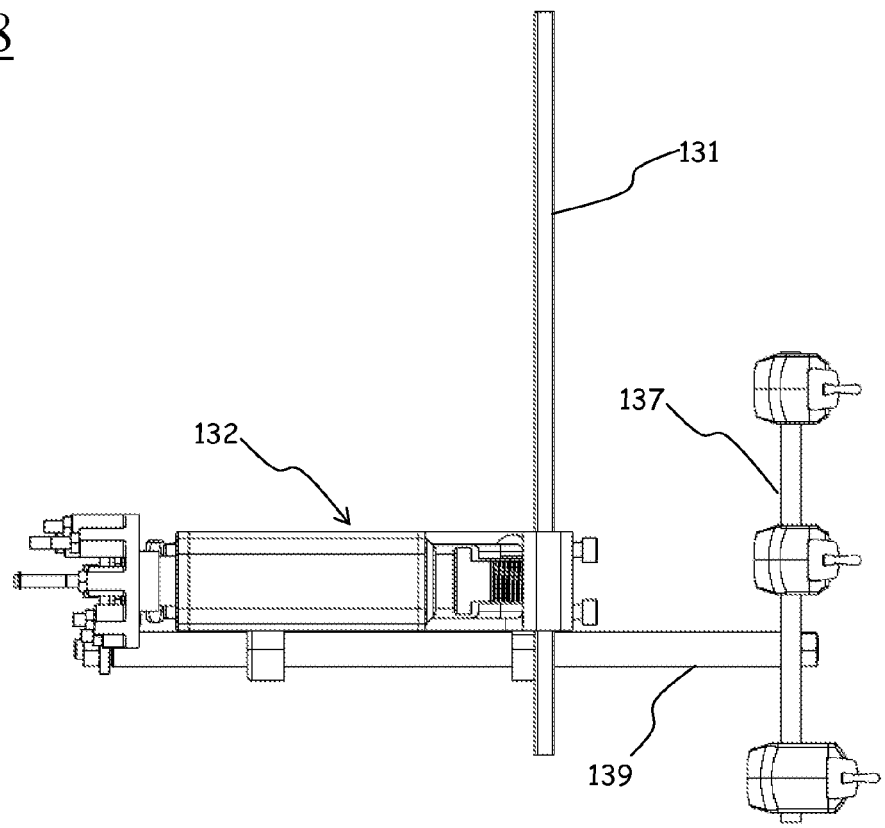
FIGS. 8 and 9 show two of eight different possible positions of the guides made possible by the system of regulation of the position of the guides according to an embodiment of the present invention.
Figure 9:
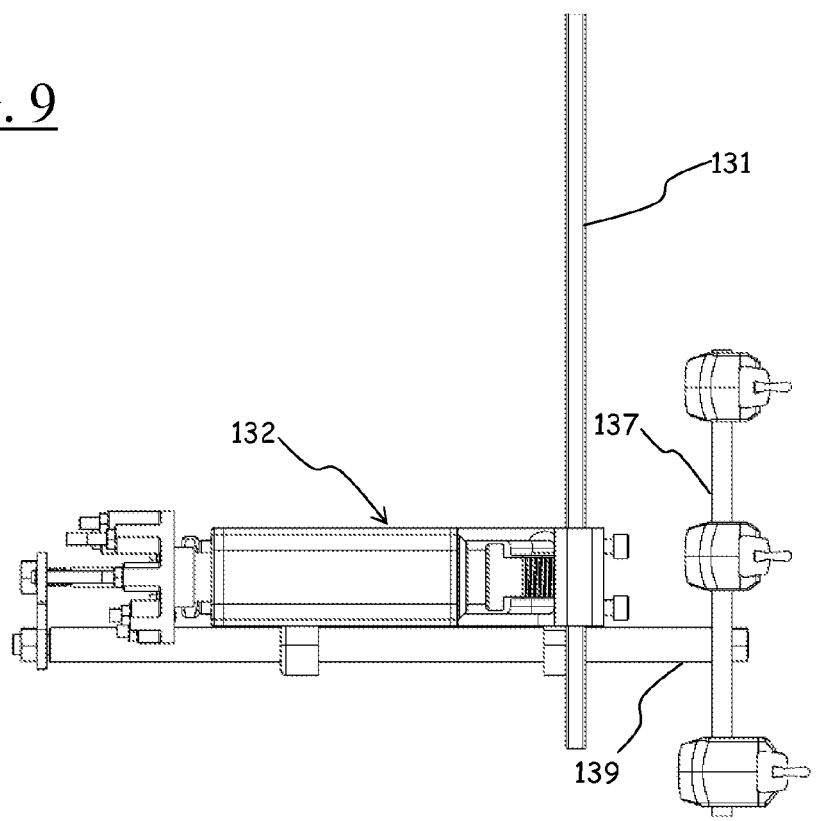

In FIGS. 8 and 9 there are shown two possible positioning of the guides 133a, b, c, respectively for the side containment of bottles of small height and diameter (for instance, bottles of 0.5 lt), and bottles of maximum height and diameter (of 1.5 lt or 2 lt).

The positioning system according to the present invention, even allowing the adjustment of the position of the side containment guides in a plurality of different positions, has a reasonable cost, because it makes use of pneumatic cylinder/piston groups with only two operating positions, that have a relatively small cost compared for example to pneumatic cylinder/piston groups with three operating positions.

Although in the exemplary embodiment described the three side containment guides are movable integrally through a single positioning unit 132, nothing prevents from adopt the solution according to the invention individually for each of the guides, or for groups of guides.

The pneumatic cylinder/piston 141 groups could, in alternative embodiments, be replaced by actuators of different type, for instance hydraulic cylinder/piston groups or electrical linear actuators, a DC electrical actuator could for instance be used, opportunely waterproofed; the selector 143 could in such case be similar to the described one.

Such electrical actuator would be energized so as to drive, identically to the pneumatic cylinder/piston 141 group of the embodiment described above, the movements in the two directions of the bar 139 that carries the containment guides, but stopping automatically upon reaching its natural end-run (maximum and minimum extension), or by means of the currently selected mechanical spacer 177 arranged on the wheel 175, for instance providing on the L-shaped bracket 147 a contact electric switch, actuated by the selected mechanical spacer 177 on the wheel 175, and capable to open the motor supply circuit in the sense of advancement, but not in that return. Also in this case, the selection of the desired spacer is automatic and does not require any manual intervention and the same energy (electric, in this case) that is used for moving the bar 139 that carries the containment guides, is exploited for actuating the selector 143.

The rotary selector 143 could be realized in several alternative forms.

An alternative to the solution previously described could for instance consist in using the pneumatic cylinder/piston 141 actuator for the forward/backward movement of the side containment guides, and of a second, pneumatic micro-piston with spring-biased auto-reentry of the respective stem, arranged in suitable way, for instance tangentially to the wheel 175, in such a way that at each actuation thereof the wheel 175 is caused to rotate of one step (for instance, ⅛ of turn). Such micro-piston could be connected to the same compressed air supply line that supplies the chamber located at the head of all the cylinder/piston 141 groups. By pressurizing this supply line, the cylinder/piston 141 groups drive the complete extension of their stems 145 (corresponding to the maximum withdrawal of the guides from the transport line, in which all the containment guides are brought in nonoperating position) and simultaneously the micro-pistons determine a first rotation of ⅛ of turn of the wheel 175. Once the position of maximum withdrawal of the guides is reached, the compressed air supply line is discharged. The cylinder/piston groups 141 remain therefore where they are (stem 145 extended), while the stems of the micro-pistons withdraw, because of the internal springs, thereby preparing for a further push action on the spacer-carrying wheels.

A subsequent pressurization of the compressed air supply line just discharged has the only effect of causing a new extension of the stems of the micro-pistons such as to determine a new rotation of one step (⅛ of turn) of the spacer-carrying wheels 175. A succession of pressurizations and discharges of said compressed air supply line thus causes the synchronous rotation of all the spacer-carrying wheels 175 present in all the devices. Once the desired angular position of the spacer-carrying wheels 175 is reached, the same compressed air supply line is discharged, and by pressurizing the chambers of the cylinder/piston 141 groups located at the pistons' tail (at the side of the stem 145) the stems 145 of the cylinder/piston 141 groups can withdraw and drag the "L"-shaped bracket 147 in abutment to the selected spacer 177, achieving the correct positioning of the guides.

A further alternative could consist in providing an electric step-by-step motor for the rotation of the spacer-carrying wheel 175, or an electromagnetic actuator, of small dimensions, configured for causing the rotation of the spacer-carrying wheel 175 of one step (a fraction of 360°) every time it is energized, acting on a succession of paddles connected in circular succession to the wheel 175 and projecting in proximity of a push member of said electromagnetic actuator.

Other alternative could consist in the use, instead of a rotary selector, of a linear selector, for instance with the spacers 177 mounted on a rack mechanism.

Although described in connection with the positioning of the side containment guides of a pneumatic conveyor of bottles in plastics, the present invention can also be applied to the positioning of the support guides 117, for instance to adjust the width of the gap therebetween, so as to adapt to the transport of bottles with necks of different diameter, and, more generally, the present invention can be applied for the positioning of any guide in conveyors, of any type, for instance belt or chain conveyors.

In general, the present invention has been described herein in terms of some possible embodiments. It is clear that those skilled in the art can devise several changes to the described embodiments, as well as conceive other embodiments of the present invention, without for this departing from the scope of the invention defined in the appended claims.

The invention claimed is:

1. A positioning unit, comprising:
    a support for a member to be positioned;
    an actuator having a stem moving the support between a plurality of predetermined working positions; and
    a position selector having a plurality of spacers, each spacer being sequentially movable into an operative position positioning the stem of the actuator, each spacer corresponding to one of said plurality of predetermined working positions of the support,
    wherein the position selector is coupled to the actuator, such that actuation of the actuator drives the position selector.

2. A positioning unit as in claim 1, wherein said position selector includes a selection cycle during which a transition is made replacing a current spacer with a next spacer in the operative position.

3. A positioning unit as in claim 2, wherein the selection cycle comprises a first phase in which an excursion of the actuator in a first direction drives the initiation of said transition.

4. A positioning unit as in claim 3, wherein the position selector comprises a spring mechanism which is driven into a compressed condition by the first-direction excursion of the actuator.

5. A positioning unit as in claim 4, wherein the selection cycle comprises a second phase in which the spring mechanism is released and drives completion of said transition.

6. A positioning unit as in claim 3, wherein after completion of the selection cycle, the actuator is operable to make an excursion in a second direction, opposite said first direction, limited in travel by the spacer in the operative position, thereby moving the support into a said predetermined working position.

7. A positioning unit as in claim 1, comprising a rotation mechanism moving the spacers into said operative position.

8. A positioning unit as in claim 1, wherein the actuator is selected from a group consisting of a pneumatic cylinder/piston assembly, a hydraulic cylinder/piston assembly, and an electric linear actuator.

9. A system for adjusting the position of guides of a conveyor of articles comprising a positioning unit as in claim 1.

10. A conveyor of articles having guides for the support and/or containment and/or routing of an article, said guides being positioned by a positioning unit as in claim 1.

* * * * *

UNITED STATES PATENT AND TRADEMARK OFFICE
CERTIFICATE OF CORRECTION

PATENT NO. : 8,613,355 B2
APPLICATION NO. : 13/319538
DATED : December 24, 2013
INVENTOR(S) : Andrea Andreoli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 51 days.

Signed and Sealed this
Twenty-second Day of September, 2015

Michelle K. Lee
*Director of the United States Patent and Trademark Office*